United States Patent
Rollfink et al.

(10) Patent No.: US 8,882,418 B2
(45) Date of Patent: Nov. 11, 2014

(54) LOCKING DEVICE FOR AN EQUIPMENT ITEM ON A LOCKING TRACK

(71) Applicant: EADS Deutschland GmbH, Ottobrunn (DE)

(72) Inventors: Patrick Rollfink, Hamburg (DE); Martins Pommers, Riga (LV)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 13/945,345

(22) Filed: Jul. 18, 2013

(65) Prior Publication Data

US 2014/0030039 A1 Jan. 30, 2014

(30) Foreign Application Priority Data

Jul. 27, 2012 (DE) .......................... 10 2012 106 865

(51) Int. Cl.
*B60P 7/08* (2006.01)
*B64D 11/06* (2006.01)

(52) U.S. Cl.
CPC .................................. *B64D 11/0696* (2013.01)
USPC .......................................................... 410/105

(58) Field of Classification Search
USPC ............... 410/104, 105, 106, 116; 244/118.1, 244/118.6; 248/503.1
See application file for complete search history.

(56) References Cited

U.S. PATENT DOCUMENTS

| 4,496,271 A | * | 1/1985 | Spinosa et al. ................ 410/105 |
| 5,489,172 A | | 2/1996 | Michler |

FOREIGN PATENT DOCUMENTS

| EP | 0583295 B1 | 2/1994 |
| EP | 1342662 A1 | 9/2003 |

\* cited by examiner

*Primary Examiner* — Stephen Gordon
(74) *Attorney, Agent, or Firm* — Hoffmann & Baron, LLP

(57) ABSTRACT

A device for locking an equipment item onto a locking track attached to the floor of a cabin includes a support component, the underside of which includes a insertion section adapted to the contour of a longitudinal slot of the locking track, where the insertion section can be inserted into the locking track, and on the support component a sliding section that can be inserted into the locking track is guided so it can be longitudinally shifted, the outer contour of which corresponds to that of the insertion section, wherein the sliding section can be shifted in the locking track relative to the support component in order to lock the support component on the locking track.

15 Claims, 2 Drawing Sheets

LOCKING DEVICE FOR AN EQUIPMENT ITEM ON A LOCKING TRACK

CROSS-REFERENCE TO RELATED APPLICATIONS

The present application claims priority to German Patent Application Serial No. 10 2012 106 865.8 filed on 27 Jul. 2012, the contents of which are incorporated herein by reference in their entirety.

BACKGROUND

1. Field of Technology

The present application relates to a device for locking an equipment item onto a locking track attached to the floor of a cabin, including two parallel retaining edges divided by a longitudinal slot and a number of spatially separated openings, wherein the device has on its upper side means for locking the equipment item and on its lower side includes at least two locking projections the size and the arrangement of which are adapted to at least two adjacent openings, and wherein by shifting the locking projections in the longitudinal direction of the locking track until the locking projections are located between two adjacent openings, a positive connection between the device and the locking track can be produced.

2. Brief Description of Related Art

Such a device is known from U.S. Pat. No. 5,871,318, for example, and is used in particular for the longitudinal shifting of aircraft seats along locking tracks that are attached onto the cabin floor of an aircraft. In order to fasten the aircraft seats onto the locking tracks, the device is initially aligned such that a support component with molded projections is aligned with the circular openings, so that this can be moved through the longitudinal slot in the locking track. The support component is then moved by half the distance between adjacent openings in the longitudinal direction of the track, wherein the T-shaped cross-sectional projections engage behind the retaining edges on both sides of the locking track and prevent the support component from coming out of the locking track. In a third step, locking parts having a corresponding contour are then moved down by the support component, so that these are retained in the openings which are now located below. In this context, the locking parts are pushed against the retaining edges, which results in locking the support component and thus the seat attached to it in the track.

In this case it is disadvantageous that the support components, after having been inserted into the locking track, must be moved as accurately as possible by half the distance of the opening, so that the locking parts engage into the openings and thus making secure locking possible. Since several seats are normally combined in one row and are arranged on one seat support, it is necessary that this entire row of seats must be moved. This process requires some time for assembly, particularly if the distance by which the row of seats is shifted deviates too greatly from the setpoint, and locking is not possible initially until some fine alignment has been done. This shifting process can also result in some tilting and can thus produce jamming.

SUMMARY

The object of the present application is to prevent the above disadvantages and to facilitate a structurally simple device for locking an equipment item onto a locking track attached to the floor of a cabin, permitting quicker and uncomplicated assembly.

This problem is solved by the features, developments and embodiments described in the present application. Further features, possibilities of application, and advantages result from the description below and the explanation of the various embodiments, which are illustrated in the figures.

The object is in particular solved in that the device according to the present application includes a support component, the underside of which includes an insertion section that is adapted to the longitudinal slot contour which can be inserted into the locking track, and that an insertable sliding part is guided in the locking track so that it can be shifted longitudinally, the outside contour of which corresponds to the insertion section, wherein the sliding part can be shifted in the locking track relative to the support component to lock the support component.

This design has the advantage that the support component has to be inserted only into the locking track, and therefore does not need to be shifted in the longitudinal direction of the track after the equipment item (e.g. the row of seats) has been inserted, but instead remains in this position. Rather, the sliding part that in the unlocked position is arranged below the support component is shifted by half the distance between adjacent openings. The support component is positively held in the locking track in this position. For this purpose, the outside contour of the sliding part does not have to completely match that of the insertion section, but it is rather important that the device can be inserted into the locking track without the possibility of entanglement during insertion or retraction.

According to an advantageous development of the present application, the insertion section has the contour of two or three adjacent openings. In this manner it is accomplished that a solid contact of the support component on the locking track is ensured.

According to an advantageous development of the present application, the contour of the sliding part corresponds to the contour of two or three adjacent openings. This prevents the sliding part from tilting during its movement.

According to an advantageous development of the present application, the bottom of the support component comprises a T-shaped groove in the longitudinal direction, and the sliding part has a corresponding guide section with a T-shaped cross-section. This facilitates good and secure guidance of the sliding part in the support component. T-shaped is to be understood in that the groove and/or guide have the shape of a swallowtail, or similar.

According to an advantageous development of the present application, the sliding part is essentially L-shaped with an actuating projection extending vertically. This actuating projection which is arranged ahead of the front face of the support component projects from the longitudinal slot and makes it possible to shift the sliding part within the locking track below the support component from outside of the longitudinal slot in the longitudinal direction of the track.

The actuating projection is preferably positioned in the locked condition on the support component or on a limit stop molded on the support component. In the unlocked position, the actuating projection will preferably be spaced apart from the support component, the distance of which corresponds to half of the distance between adjacent openings.

According to an advantageous development of the present application, the sliding part can be moved relative to the support component by a distance which corresponds to half of the distance between adjacent openings in the locking track. For that purpose, corresponding limits are provided either in the guide of the sliding part in the support component, or in another position. An easy design consist in that the actuating projection in the locked position bears against the support component or against another limit stop provided on it, and that a projection is formed on the end of the T-shaped guide of the sliding part, which then strikes against the support component.

According to an advantageous development of the present application, a guide projection is molded onto the actuating projection and a correspondingly shaped guide recess is assigned to it in the support component, wherein the guide projection during the shift of the sliding part in the locked condition slides into the guide recess. This design results in making the connection between the support component and the sliding part more rigid in the locked condition.

According to an advantageous development of the present application, the support component has a locking guide on one front face, in which the locking element is held movable, and that a counterpart is formed in the sliding part which accommodates the locking element, so that the sliding part is locked with respect to the support component when the locking element is in the locked position. This design ensures that the device according to the present application does not unintentionally get from the locked into the unlocked position, and therefore, such as by vibration, unintentional loosening of the equipment item held by means of the device according to the present application, occurs.

The locking element will preferably be a vertically movable pin and the counterpart a recess. This is a very straightforward design, structurally.

The locking element is preferably placed elastically into the closed position so that it will automatically engage when the locked position is reached. This design makes the assembly particularly easy and fast, because it requires no separate locking. A further advantage is if the locking element engages audibly or is perceivable haptically.

The locking element will preferably have unlocking means that can be manually actuated, such as a handle or an annular section through which a finger can be inserted, in order to move the locking element into the unlocked position manually. Alternatively, the locking element can have a small projection in the guided center section, and a corresponding guide for the projection is provided in the locking guide, so that in both and positions, the pin can be put into a locked position by a 90° rotation in each case.

The locking element preferably comprises an indicator to indicate the locked condition, such as a red section of the pin that protrudes in the unlocked condition to indicate that locking has not occurred.

A preferred use of the device according to the present application is in an aircraft, in particular in a passenger aircraft, and the equipment item preferably is an aircraft seat or a row of aircraft seats.

Further advantages, features and particulars can be found in the following description, in which at least one embodiment is described in detail, by reference to the drawings. The subject matter of the present application is any of the described and/or illustrated features presented, either on their own, or in any useful combination thereof. Identical, similar and/or functionally identical components have been given the same reference numbers.

DETAILED DESCRIPTION

Figure 1:
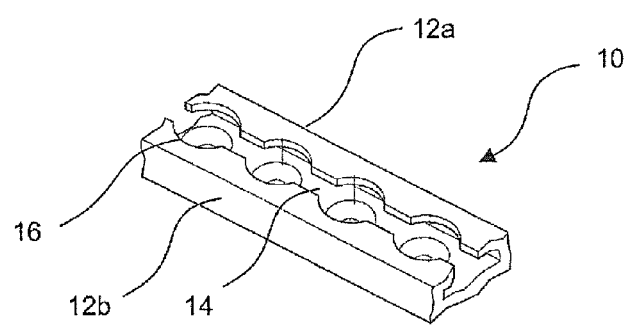
FIG. 1 is a perspective cutaway view of a locking track.

FIG. 1 illustrates a locking track 10, as typically arranged in aircraft, particularly in passenger aircraft, for attaching equipment items such as seats, seat rows, partitions, galleys, or luggage racks. The locking track 10 includes two parallel retaining edges 12a, 12b, between which a longitudinal slot 14 is defined, including circular openings 16 spaced apart evenly, such as at one inch.

Figure 4:
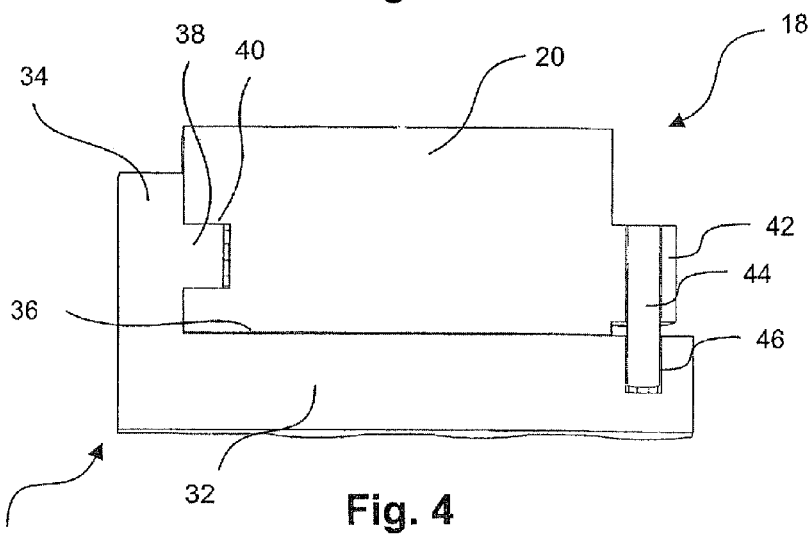
FIG. 4 is a longitudinal section through the device according to the present application.
Figure 5:
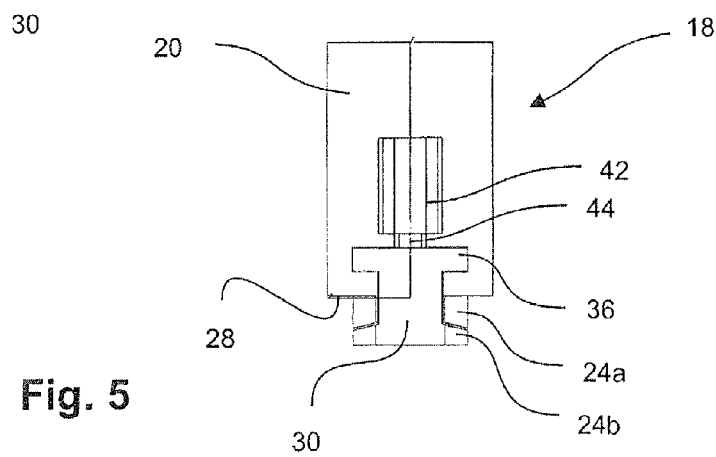
FIG. 5 is a front elevation of the device according to the present application.
Figure 2:
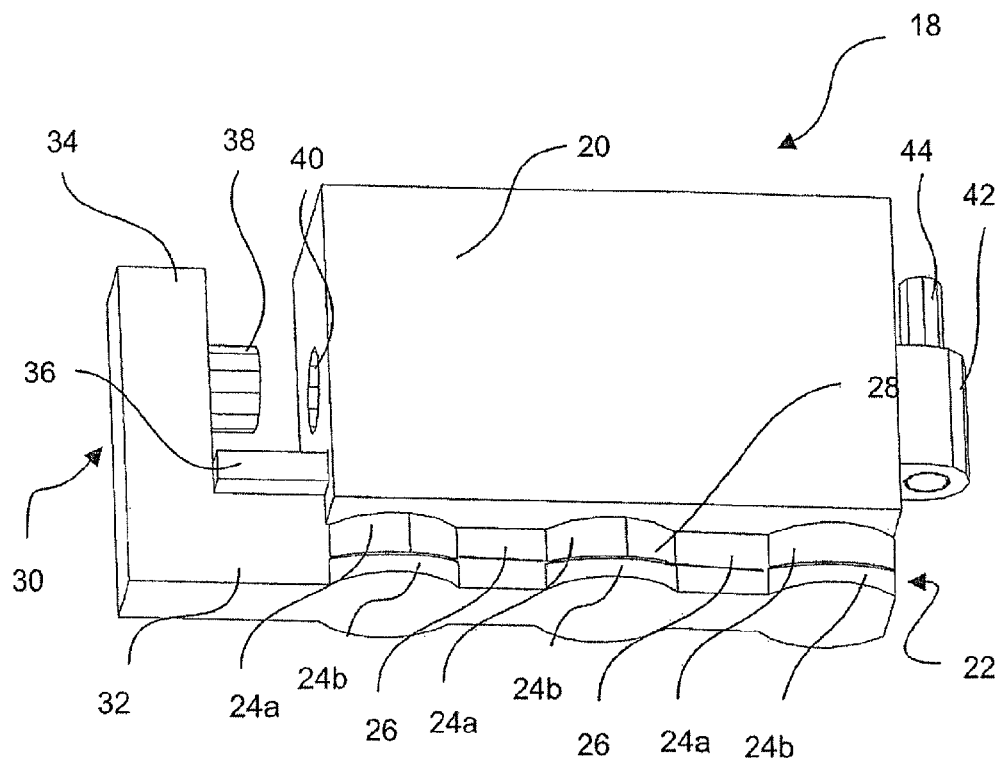
FIG. 2 is a perspective illustration of the device according to the present application in the unlocked condition.
Figure 3:
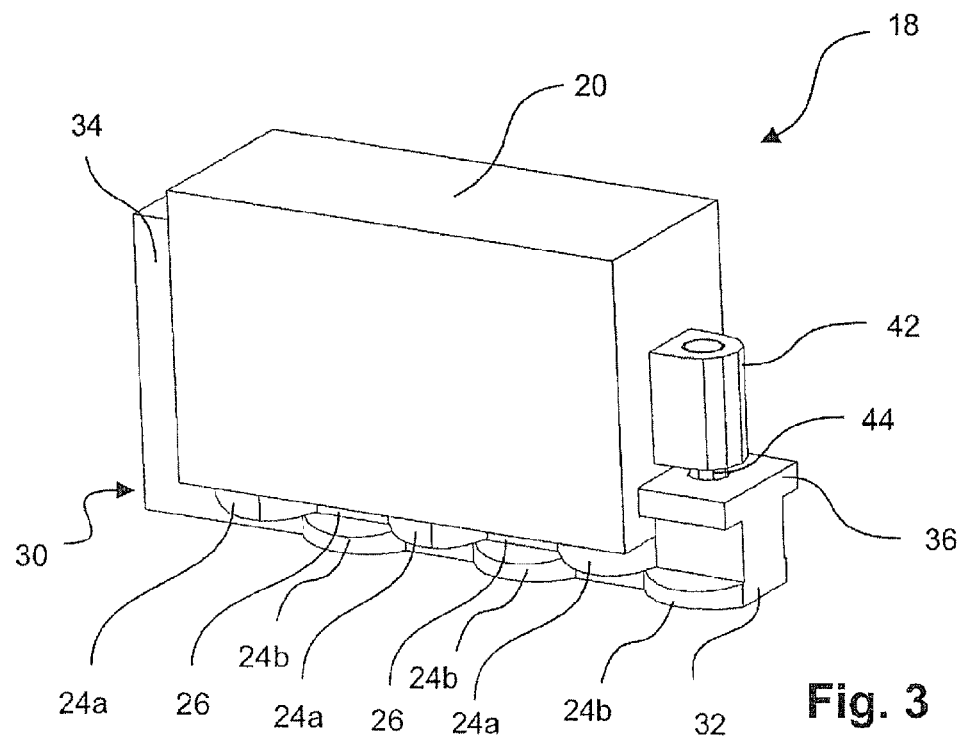
FIG. 3 is a perspective illustration of the device according to the present application in the locked condition.

FIG. 2 is a device 18 according to the present application as a perspective illustration looking at the side from below, in the unlocked condition. The identical device 18 is shown in FIG. 3 as a perspective illustration looking at the side from above, in the locked condition. FIG. 4 is the identical device 18 also in the locked condition, illustrated as a vertical longitudinal section.

The device 18 shown in FIGS. 1 to 4 includes a support component 20, on the upper side of which devices are attached (not shown) for attaching equipment items. At the bottom of the support component 20, an insertion section 22 is molded, which has a cross-sectional contour which matches the contour of the longitudinal slot 14 in the locking track 10 with the openings 16. In the represented embodiment, the insertion section 22 in particular includes three cylindrical sections 24a, the outside diameter of which is slightly smaller than the diameter of the openings 16 and which are arranged equally spaced apart as the openings 16. These three cylindrical sections 24a are connected to each other by means of straight-line sections 26, the width of which corresponds to the width of the longitudinal slot 14 in the locking track 10. It is therefore possible to insert the insertion section 22 with the three cylindrical sections 24a and the straight-line sections 26 positioned in-between into the locking track 10, which supports itself along the bottom surface 28 of the support component 20 on the retaining edges 12a, 12b of the locking track 10.

The device 18 furthermore includes a sliding part 30 that is essentially L-shaped and which includes a horizontal section 32 and an actuating projection 34. The horizontal section 32 has the same outside contour as the insertion section 22 of the support component 20, and therefore also includes three cylindrical sections 24b, which in the unlocked embodiment shown in FIG. 2 are aligned with the cylindrical sections 24a of the insertion section 22. The sliding part 30 has a T-shaped or swallowtail-shaped guide 36, which guides the sliding part 30 in the support component 20.

A guide projection 38 is molded onto the actuating projection 34, which can engage in a matched guide recess 40. In the unlocked position represented in FIG. 2, the guide projection 38 is located so that it is disengaged from the guide recess 40, while in the locked position shown in FIG. 3, the guide projection 38 and the guide recess 40 are engaged, as a result of which the rigidity of the connection between support component 20 and sliding part 30 is increased in the locked condition.

A locking guide 42 for accommodating a locking element 44 is furthermore provided on the support component 20, which can slide into a recess 46 formed in the sliding part 30. The locking element 44 is pushed down by spring devices (not shown) and then automatically latches into the recess 46 as soon as the locking element 44 and the recess 46 are aligned with each other. To move the locking element 44 out of the recess 46 again, it has means (not shown), for example an annular section molded onto the upper end through which a finger can be inserted to then pull it. The locking element 44 will preferably have a bright color or a fluorescent coating so that it can be seen from outside whether it is in a latched position or not.

Prior to the assembly on the locking track 10, the device 18 according to the present application will be in the position shown in FIG. 2, in which the cylindrical sections 24*a* and 24*b* are aligned, and can therefore be inserted into the openings 16 of the locking track 10. As mentioned previously, in this position the guide projection 38 is disengaged from the guide recess 40 and the locking element 44 is disengaged from the recess 46. In this position, the device 18 will therefore be guided in the longitudinal slot 14 of the locking track 10.

Thereafter, by manual actuation of the actuating projection 34 in the direction of the support component 20, the sliding part 30 is moved into the locked position shown in FIGS. 3 and 4. In this position, the cylindrical sections 24*b* of the horizontal section 32 are located offset by half the distance between adjacent cylindrical sections 24*b*, which distance is identical to the distance between adjacent cylindrical sections 24*a* and also identical to the distance between adjacent openings 16. In this context, the cylindrical sections 24*b* are positioned below the retaining edges 12*a*, 12*b*, of the locking track 10, so that the support component 20 is thus retained in the locking track 10. At the same time, in this position the guide projection 38 is engaged in the guide recess 40 and thus increases the rigidity of the connection. Moreover, in this position the locking element 44 is engaged in the recess 46 and thus prevents a reverse movement of the sliding part 30 relative to the support component 20.

In order that during the locking procedure of the device 18 according to the present application, i.e. that clamping occurs together with the longitudinal shift of the sliding part 30, so that the device does not wobble in the locked condition, the sections 24*b* of the sliding part 30 can have a slight bevel in the longitudinal direction and/or in the direction of movement. In this way, the slack during the shifting of the sliding part 30 would increasingly become smaller automatically, which would ultimately result in clamping.

LIST OF REFERENCE SYMBOLS

10 Locking track;
12*a*, b Retaining edges;
14 Longitudinal slot;
16 Openings;
18 Device;
20 Support component;
22 Insertion section;
24*a*, *b* Sections;
26 Sections;
28 Bottom surface;
30 Sliding part;
32 Horizontal section;
34 Actuating projection;
36 Guide;
38 Guide projection;
40 Guide recess;
42 Locking guide;
44 Locking element; and
46 Recess.

The invention claimed is:

1. A device to lock an equipment item onto a locking track attached to a floor of a cabin, the locking track comprising parallel retaining edges divided by a longitudinal slot and a plurality of spatially separated openings to define a longitudinal slot contour, the device comprising:
   a support component comprising a guide slot and an insertion section, the guide slot extending longitudinally through the support component, the insertion section extending along a portion of an underside of the support component, the insertion section having a first contour that approximates the longitudinal slot contour of the locking track; and
   an L-shaped sliding component comprising a horizontal section and an actuating projection that extends vertically from the horizontal section, the horizontal section comprising a guide and an engagement section, the guide disposed in the guide slot such that the L-shaped sliding component is slideable longitudinally with respect to the support component, the engagement section extending along a portion of the horizontal section, the engagement section having a second contour that approximates the first contour of the insertion section;
   wherein in a first position the first contour is alignable with respect to the second contour and the longitudinal slot contour such that the engagement section of the sliding component is insertable into the longitudinal slot of the locking track, and in a second position the L-shaped sliding component is slid longitudinally with respect to the support component such that the engagement section engages the locking track.

2. The device according to claim 1, wherein the first contour of the insertion section comprises a contour of two or three adjacent openings.

3. The device according to claim 1, wherein the second contour of the L-shaped sliding component comprises a contour of two or three adjacent openings.

4. The device according to claim 1, wherein the guide slot is a T-shaped slot formed in a bottom of the support component.

5. The device according to claim 4, wherein the horizontal section that comprises the guide has a corresponding T-shaped cross-section.

6. The device according to claim 5, wherein the actuating projection in the second position bears against the support component.

7. The device according to claim 1, wherein the L-shaped sliding component is slideable relative to the support component by a distance that corresponds to half a distance between adjacent openings in the locking track.

8. The device according to claim 1, wherein the actuating projection comprises a guide projection to which a guide recess is assigned in the support component, wherein the guide projection slides into the guide recess when the L-shaped sliding component is slid into the second position.

9. The device according to claim 1, wherein the support component comprises a locking guide in which a movable locking element is held, and the L-shaped sliding component comprises a counterpart element which accommodates the locking element, such that that the L-shaped sliding component is locked with respect to the support component when the movable locking element is in a locked position.

10. The device according to claim 9, wherein the locking element is a pin which is movable vertically and the counterpart element is a recess in the horizontal section of the L-shaped sliding component.

11. The device according to claim 9, wherein the movable locking element engages the counterpart element automatically when the movable locking element is aligned with the counterpart element.

12. The device according to claim 9, wherein the movable locking element comprises an unlocking means that is actuated manually.

13. The device according to claim 9, wherein the locking element has an indicator to indicate the locked position.

14. The device according to claim 1, wherein the cabin is part of an aircraft.

15. The device according to claim 14, wherein the equipment item is an aircraft seat or a row of aircraft seats.

\* \* \* \* \*